(12) United States Patent  (10) Patent No.: US 7,237,309 B2
Nicaise  (45) Date of Patent: Jul. 3, 2007

(54) MILLING MACHINE FOR LONGITUDINAL PROFILED ELEMENTS

(75) Inventor: Jean-Pierre Nicaise, Saint Jean Lagineste (FR)

(73) Assignee: Cinetic Machining, St. Laurent les Tours (FR)

( * ) Notice: Subject to any disclaimer, the term of this patent is extended or adjusted under 35 U.S.C. 154(b) by 0 days.

(21) Appl. No.: 10/497,662

(22) PCT Filed: Dec. 6, 2002

(86) PCT No.: PCT/FR02/04224

§ 371 (c)(1),
(2), (4) Date: Jun. 13, 2005

(87) PCT Pub. No.: WO03/047813

PCT Pub. Date: Jun. 12, 2003

(65) Prior Publication Data

US 2005/0229754 A1  Oct. 20, 2005

(30) Foreign Application Priority Data

Dec. 6, 2001  (FR) .................................. 01 15797

(51) Int. Cl.
*B23P 23/00* (2006.01)
(52) U.S. Cl. .................. 29/27 C; 82/127; 409/159; 414/14
(58) Field of Classification Search .............. 29/27 C, 29/27 R; 82/127, 124, 126, 165; 409/172, 409/159; 414/14; 83/54, 182, 206, 277, 83/294
See application file for complete search history.

(56) References Cited

U.S. PATENT DOCUMENTS 5,343,603 A * 9/1994 Pioch ........................ 29/27 C
6,483,075 B1 * 11/2002 Yamazaki et al. ..... 219/121.82

FOREIGN PATENT DOCUMENTS

| AT | 385226 | 3/1988 |
|---|---|---|
| EP | 0705655 | 4/1996 |
| EP | 1068925 A2 | 1/2001 |
| FR | 2685239 | 6/1993 |
| FR | 2770161 | 4/1999 |
| FR | 2770433 | 5/1999 |
| FR | 2792864 | 11/2000 |
| JP | 05031639 | 2/1993 |

* cited by examiner

*Primary Examiner*—Erica Cadugan
(74) *Attorney, Agent, or Firm*—Connolly Bove Lodge & Hutz LLP

(57) ABSTRACT

The present invention relates to a machine intended for the machining of profiled elements (10), of the type comprising a longitudinal frame (1) provided with holding dollies (11, 13) for holding the profiled element to be machined (10). This machine is characterized in that it comprises at least two holding dollies (11, 13) capable, in the machining, of securing the slide-holding of the profiled element (10), and at least one drive dolly (15, 17), in which the profiled element (10) is slide-mounted, this drive dolly (15, 17) being provided with a device for securing its temporary fixed connection to the profiled element (10) such that the relative displacement of the latter relative to the machining head (9) in the longitudinal direction (yy') is secured, at least in part, by the displacement of this drive dolly (15, 17).

4 Claims, 1 Drawing Sheet

MILLING MACHINE FOR LONGITUDINAL PROFILED ELEMENTS

FIELD OF THE INVENTION

The present invention relates to a machine intended for the machining of longitudinal profiled elements, especially by the removal of chips.

BACKGROUND OF THE INVENTION

Machines intended for the machining of such profiled elements, which are constituted by two assemblies, namely a milling assembly comprising a machining head movable along three axes, vertical, longitudinal and transverse, and an assembly of two dolly carriages, which are each capable of admitting the profiled elements in sliding and clamping arrangement and of positioning them angularly relative to the machining head. During the machining operation, the dollies secure the holding of the profiled element and, in order to do so, are fixedly connected thereto. These dollies are disposed at a certain distance apart which is a function of the rigidity dictated by the type of machining to be performed. This spacing thus defines a work window representing the maximum machining length which the machine will be able to perform in one step, so that, in order to machine the whole of the rod, an approach based on successive steps is adopted.

In order to simplify the restart procedures necessary between each step, it has been proposed to combine with these dollies one or more additional dollies. These dollies, while realizing a holding with reference to the profiled element, secure the displacement of the latter between the different machining phases corresponding to the different successive steps.

Such devices only permit a step-by-step machining of the profiled element, wherein the step length may not exceed the width of the window defined by the spacing of the two dollies, this spacing itself being a function of the precision of the desired machining.

BRIEF DESCRIPTION OF THE INVENTION

The object of the present invention is to eliminate these drawbacks by proposing a metal-working machine by which a fully continuous machining of such profiled elements can be realized.

The subject of the present invention is thus a machine intended for the machining of longitudinal profiled elements, of the type comprising a longitudinal frame provided with holding dollies for holding the profiled element to be machined and provided with at least one machining head which can be moved relative to the profiled element according to displacement components which are preferably perpendicular to each other and perpendicular to the longitudinal axis of said profiled element, which machine comprises:

at least two holding dollies disposed close to and on either side of the machining head, which are capable, in the machining, of securing the slide-holding of the profiled element, at least two drive dollies capable of moving longitudinally relative to the frame, disposed on either side of the holding dollies, each drive dolly being provided with a chuck by which, according to requirement, a sliding clamping of the profiled element or a locking of this profiled element can be secured such that the relative displacement of the latter relative to the machining head in the longitudinal direction is secured, at least in part, by the displacement of a drive dolly, control means for operating the displacements of the drive dollies and of the chucks, these control means being capable, as a function of the various machining phases to be realized, of securing the driving of the profiled element with the aid of one or more drive dollies and of synchronizing the movements of the drive dollies, characterized in that the control means are designed to operate, in a machining operation, a fixed-connection fastening onto the profiled element of a dolly in the end position and a slide-fastening of the other drive dolly, and to secure the relative longitudinal displacement of the profiled element by operating its displacement through that of the dolly to which it is fixedly connected and which then forms a "dominant" dolly, and when the "dominant" dolly arrives close to the holding dolly, the control means, on the one hand, operate the separation of the dolly from the profiled element and, on the other hand, the fixed connection of the other drive dolly, which then becomes the "dominant" dolly, to the profiled element and which dolly secures the relative longitudinal displacement of the profiled element, whilst the first drive dolly is returned to position ready to become "dominant" again.

Preferably, at least the holding dollies will be provided with a rotary chuck comprising a clamping device for the profiled element capable of securing its positioning about its longitudinal axis.

Finally, it has proved beneficial, in order to realize certain types of machining, for the machining head to comprise displacement means acting in the longitudinal direction of the profiled element.

BRIEF DESCRIPTION OF THE FIGURES

An embodiment of the present invention will be described below, by way of non-limiting example, with reference to the appended drawing, in which.

DETAILED DESCRIPTION OF THE INVENTION

Figure 1:
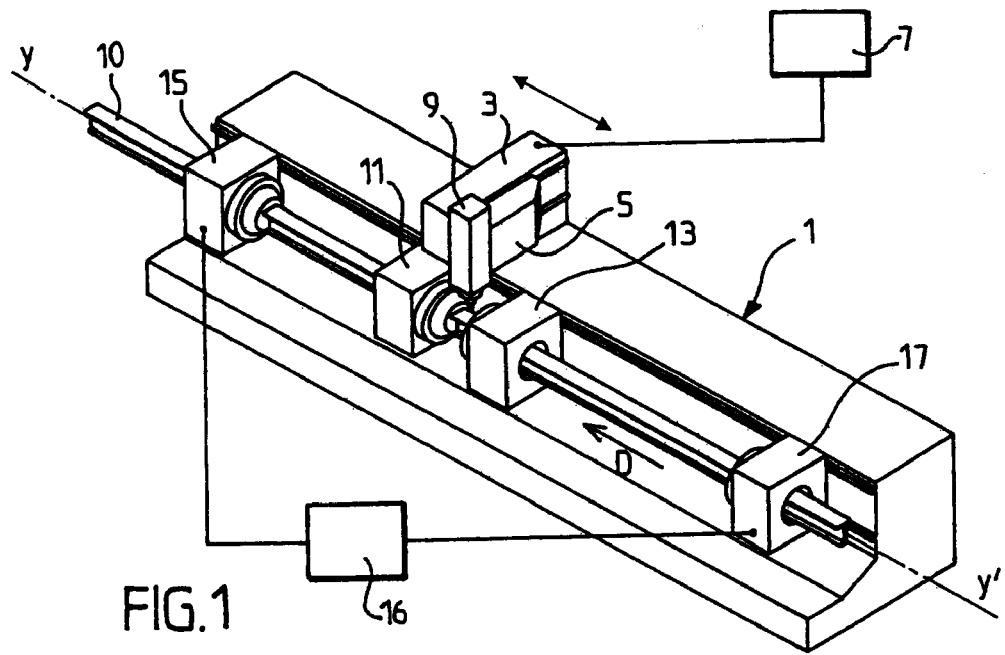
FIG. 1 is a diagrammatic perspective view of an embodiment of a metal-working machine according to the invention.

The metal-working machine according to the invention, represented in FIG. 1, comprises a longitudinal bed 1, which supports a crosspiece 3 fixed substantially to the centre of the bed 1. This crosspiece 3 supports a saddle 5, which is provided with cross-drive means operated by numeric control means 7. The saddle 5 itself supports a machining head 9, which is mounted such that it is vertically movable under the control of the numeric control means 7. The machining head 9 is thus capable of moving in the transverse, vertical and, possibly, longitudinal directions.

The bed 1 is likewise provided with four dollies, namely two holding dollies 11 and 13, disposed on either side of the machining head 9, and two drive dollies 15 and 17, disposed on either side of the holding dollies. The drive dollies 15, 17, as well as the holding dollies 11, 13, can be moved longitudinally on the bed 1 under the control of numeric control means 16. Their movement can be made in a totally mutually independent manner or, conversely, in a perfectly synchronized manner and this according to their control program.

In a known manner, the holding dollies 11, 13 and the drive dollies 15, 17 are equipped with variable-pressure chucks by which, according to requirement, a locking and a clamping of a profiled element 10 or, conversely, a sliding clamping of the latter, and this as a function of instructions provided by the numeric control means 16, can be secured. The chucks are equipped with means by which the profiled element 10 can be rotated about its longitudinal axis yy' and with reference means by which the profiled element 10 can be positioned relative to the said longitudinal axis.

The working of the machine according to the invention is as described in the following example.

The profiled element 10 is firstly introduced into the four dollies in such a way that it comes into contact with the provided reference, thereby securing its angular positioning relative to the longitudinal axis yy', then the holding dollies 11 and 13 are positioned at a slight distance apart such as to promote a better machining quality. The chucks of these dollies are clamped onto the profiled element 10 such that they do not to lock it but allow it slide displacement.

Figure 2:
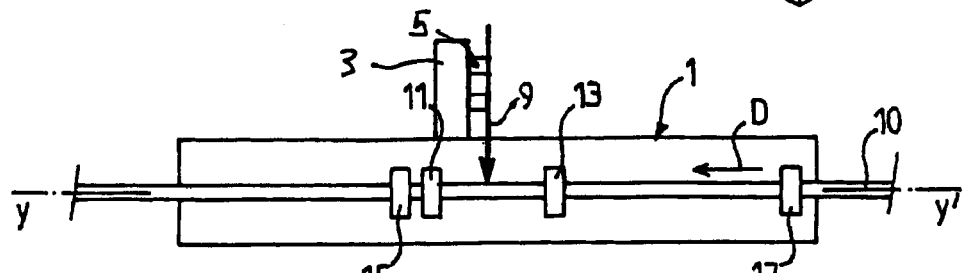
FIGS. 2 to 4 are diagrammatic views of the machine according to the invention represented in FIG. 1, in which the drive dollies have been positioned on the bed in certain characteristic positions which they are likely to occupy in the course of a machining stage.

If, for example, the passage of the profiled element 10 proceeds from right to left in the figure, according to the arrow D, the drive dolly 17 (right-hand dolly) is initially positioned in the extreme right position of the bed 1, as represented diagrammatically in FIG. 2, and the drive dolly 15 (left-hand dolly) is initially positioned against the holding dolly adjacent thereto, namely the dolly 11.

According to the invention, the numeric control means 16 in this case operate a fixed-connection fastening of the dolly 17 on the profiled element 10 and a slide-fastening of the drive dolly 15 on the profile.

Figure 3:
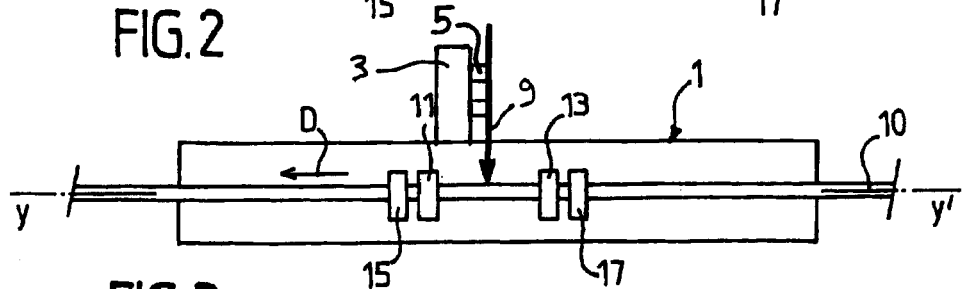
Figure 4:
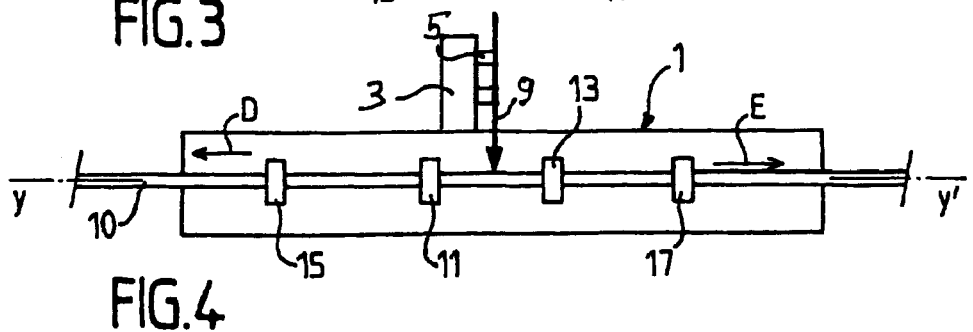

The machining operation is then started, in the course of which the relative longitudinal displacement of the profiled element 10 relative to the tool 9 is secured by operating its displacement through that of the dolly 17 to which it is fixedly connected and which then forms a so-called "dominant" dolly. It will be noted that if the direction of displacement of the profiled element in the course of machining is the direction D, that does not preclude the drive dollies, for certain parts of this machining phase, from securing an instantaneous displacement of the profiled element 10 in the reverse direction. When, as represented in FIG. 3, the dominant dolly 17 arrives close to the holding dolly 13, on the one hand the separation of the dolly 17 from the profiled element 10 is operated, via the numeric control means 16, so that this dolly then ceases to be dominant, and, on the other hand, the drive dolly 15 is fixedly connected to the profiled element 10, so that it is this dolly which then becomes the dominant dolly and secures the relative longitudinal displacement D of the profiled element 10 relative to the machining head 9. During the cycle in which the drive dolly 15 is dominant, the drive dolly 17 is returned towards the right of the bed (displacement in the direction E in FIG. 4), where it is then ready to become dominant again as soon as the drive dolly 15 reaches the end of its travel, that is to say, for example, once it is at the left end of the bed 1.

According to the invention, the continuous character of the displacement of the profiled element 10 when the drive dolly 17 reaches the end of its travel, especially when it arrives close to the holding dolly 13, can be improved. In such an embodiment, the profiled element 10 is in this case driven with the two drive dollies 15 and 17. Then, when this movement is perfectly underway, the separation of the dolly 17 is operated, which then ceases to be dominant, and it is returned to position in the rightward direction, as previously mentioned.

With the aid of numeric control means 16 and through the synchronization of the instructions given to the actuating means for the dollies, they can thus be used in such a way that the passage of the profiled element 10 in the longitudinal direction is effected perfectly continuously. In one particular machining phase, it is possible, as previously mentioned, for the two drive dollies to act simultaneously as dominant dollies. Such will be the case, for example, when there is a need to realize a machining pass which calls for a considerable force.

The present invention is particularly interesting not only in that it provides a totally continuous displacement of the profiled element, thereby avoiding the problems of restarting the machining, but also by virtue of the fact that this continuous displacement can be realized on profiled elements of whatever length.

The machine according to the invention can also, in a simplified version, only comprise a single drive dolly.

In these conditions, when the dominant dolly is close to the holding dolly adjacent thereto, all longitudinal displacement of the profiled element 10 is halted for the period needed to return the drive dolly to the end of the bed, after having separated it from the profiled element.

In certain cases, which will be specific to the machining range, it will be possible to take advantage of a phase which does not require a longitudinal drive to return the dolly, in masked time, to the end of the bed.

The invention claimed is:

1. A machine intended for the machining of longitudinal profiled elements (10), of the type comprising a longitudinal frame (1) provided with holding dollies (11, 13) for holding the profiled element to be machined (10) and provided with at least one machining head (9) which can be moved relative to the profiled element (10) according to displacement components which are perpendicular to each other and perpendicular to the longitudinal axis (yy') of said profiled element, which machine comprises:
    at least two of the holding dollies (11, 13) disposed close to and one on either side of the at least one machining head (9), which are capable, in the machining, of securing the slide-holding of the profiled element (10),
    at least two drive dollies (15, 17) capable of moving longitudinally relative to the frame, disposed one on either side of the holding dollies (11, 13), each drive dolly (15, 17) being provided with a chuck by which, according to requirement, a sliding clamping of the profiled element (10) or a locking of this profiled element can be alternately secured such that the relative displacement of the latter relative to the machining head (9) in the longitudinal direction (yy') is secured, at least in part, by the displacement of a drive dolly (15, 17) of the at least two drive dollies,
    control means (16) for operating the displacements of the drive dollies (15, 17) and of the chucks, these control means (16) being capable, as a function of various machining phases to be realized, of securing the driving of the profiled element (10) with the aid of one or more of the drive dollies (15, 17) and of synchronizing the movements of the drive dollies, wherein the control means (16) are designed to operate, in a machining operation, a fixed-connection fastening onto the profiled element (10) of a first dolly of the at least two drive dollies (17) in an end position and a slide-fastening of a second drive dolly of the at least two drive dollies (15), and to secure longitudinal displacement of the profiled element (10) by operating displacement of the profiled element through that of the drive dolly (17) to which it is fixedly connected and which then forms a "dominant" dolly, and when the "dominant" dolly (17) arrives close to one of the holding dollies (13), the control means (16) operating separation of the dominant dolly (17) from the profiled element (10) and a fixed connection of the second drive dolly (15), which second drive dolly then becomes the "dominant" dolly, to the profiled element (10) and which secures the longitudinal displacement of the profiled element (10), while the first drive dolly (17) is returned to a preselected position ready to become subsequently "dominant" again.

2. A machine according to claim 1, wherein, in order to improve the continuous character of the displacement of the profiled element (10), the control means being provided such that the profiled element (10) is driven with the first and second drive dollies (15, 17), then, once this movement is underway, the separation of the first drive dolly (17) arriving close to one of the holding dollies (13) is operated, the first drive dolly then being returned to a preselected position ready to become subsequently "dominant" again.

3. A machine according to claim 1, wherein at least the holding dollies (11, 13) are provided with a rotary chuck comprising a clamping device for the profiled element (10) capable of securing positioning of the profiled element about a longitudinal axis (yy') of the profiled element.

4. A machine according to claim 1, wherein the at least one machining head (9) comprises displacement means acting in the longitudinal direction (yy') of the profiled element (10).

* * * * *